United States Patent
Na Nakorn et al.

(10) Patent No.: US 11,811,604 B2
(45) Date of Patent: Nov. 7, 2023

(54) CROSS-PLATFORM CONTRACT VALIDATION

(71) Applicant: STRIPE, INC., San Francisco, CA (US)

(72) Inventors: Tanin Na Nakorn, Seattle, WA (US); Ji Huang, Bothell, WA (US)

(73) Assignee: STRIPE, INC., San Francisco, CA (US)

( * ) Notice: Subject to any disclaimer, the term of this patent is extended or adjusted under 35 U.S.C. 154(b) by 0 days.

(21) Appl. No.: 17/204,398

(22) Filed: Mar. 17, 2021

(65) Prior Publication Data

US 2022/0303183 A1 Sep. 22, 2022

(51) Int. Cl.
*H04L 41/0869* (2022.01)
*G06F 11/36* (2006.01)

(52) U.S. Cl.
CPC ...... *H04L 41/0869* (2013.01); *G06F 11/3664* (2013.01); *G06F 11/3688* (2013.01)

(58) Field of Classification Search
CPC ............. H04L 41/0869; G06F 11/3664; G06F 11/3688
See application file for complete search history.

(56) References Cited

U.S. PATENT DOCUMENTS

| | | | |
|---|---|---|---|
| 10,296,444 B1 | 5/2019 | Choudhary et al. | |
| 2008/0183800 A1* | 7/2008 | Herzog | H04L 67/567 709/202 |
| 2012/0297367 A1* | 11/2012 | Mujeeb | G06F 11/3688 717/124 |
| 2015/0234731 A1* | 8/2015 | Williams | G06F 11/3684 717/124 |
| 2016/0132309 A1* | 5/2016 | Rajasekhar | H04L 67/51 717/102 |
| 2017/0192879 A1* | 7/2017 | Athinathan | H04L 43/50 |
| 2017/0336938 A1 | 11/2017 | Rhee et al. | |
| 2018/0234329 A1* | 8/2018 | Wurth | G06F 11/3672 |

(Continued)

FOREIGN PATENT DOCUMENTS

WO 2019216938 A1 11/2019

OTHER PUBLICATIONS

International Search Report and Written Opinion on the Patentability of Application No. PCT/US2022/020778 dated Jun. 22, 2022, 10 pages.

*Primary Examiner* — Oleg Survillo
*Assistant Examiner* — Monishwar Mohan
(74) *Attorney, Agent, or Firm* — Womble Bond Dickinson (US) LLP

(57) ABSTRACT

A method and apparatus for performing cross-platform contract validation are described. In one embodiment, the method for validating compatibility between first and second endpoints, the method comprising: accessing a memory storing a machine-readable contract specifying a request-response pair in a file, the request-response pair consisting of an expected request that the second endpoint expects to receive from the first endpoint and an expected response that should be provided by the second endpoint according to the expected request from the first endpoint; and performing multi-platform contract validation by performing independent tests for the first and second endpoints, using the expected request and expected response specified in the machine-readable contract.

19 Claims, 4 Drawing Sheets

(56) References Cited

U.S. PATENT DOCUMENTS

2018/0307575 A1* 10/2018 Hanif .................. G06F 11/2221
2019/0319972 A1* 10/2019 Desai .................. H04L 63/1425
2021/0073026 A1*  3/2021 Myers ................. G06F 11/3065
2021/0157712 A1*  5/2021 Kalbac .................... G06N 3/08
2021/0392144 A1* 12/2021 Vaidyanath ........... G06F 16/285

* cited by examiner

CROSS-PLATFORM CONTRACT VALIDATION

FIELD

Embodiments of the present invention relate to the field of systems for software testing; more particularly, embodiments of the present invention relate to contract testing of platforms, or other endpoints, using expected requests and responses.

BACKGROUND

Software testing is a vital part of development prior to deployment to ensure that the software does not contain bugs or other errors. This is particularly important in an environment where multiple software platforms work together. In commerce platform environments, many different software platforms provide services to each other and thus are necessary to work with each other. In these environments, one software platform may generate a request and send it to another software platform, expecting that the other software platform will send the proper response to that request. In such cases, if the software platforms provide requests that are expected by the other platforms or provide the responses that are expected by other platforms in response to their requests, the platforms are deemed compatible.

During software production, changes may be made to one or multiple software platforms at the same time, and changes made to one platform could potentially cause problems for another platform. For example, a software platform may change the requests it generates or the responses it provides when receiving requests, resulting in a request or response that is incompatible with the other software platform(s). Such changes may be as small as omitting a parameter upon which another software platform relies. Therefore, any change that is made to a software platform that works with other platforms may result in the software platforms becoming incompatible and may cause one or multiple software platforms to break.

As companies grow in size in terms of the number of engineers they have, the amount of software code that is employed, and the number of services that are provided, the software changes in different services must be made with more care to ensure compatibility.

SUMMARY

A method and apparatus for performing cross-platform contract validation are described. In one embodiment, the method for validating compatibility between first and second endpoints, the method comprising: accessing a memory storing a machine-readable contract specifying a request-response pair in a file, the request-response pair consisting of an expected request that the second endpoint expects to receive from the first endpoint and an expected response that should be provided by the second endpoint according to the expected request from the first endpoint; and performing multi-platform contract validation by performing independent tests for the first and second endpoints, using the expected request and expected response specified in the machine-readable contract.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, to avoid obscuring the present invention.

Techniques are disclosed herein for testing software platforms or endpoints to validate compatibility with each other. In one embodiment, these software platforms are part of a commerce platform environment and work together. For example, one software platform may be designed to provide a particular service in response to requests from one or more other software platforms. In one embodiment, the software platforms are designed to generate and send requests to other software platforms (e.g., software platforms providing services to the requesting platform) in the environment for which responses will be generated and/or will receive requests from other software platforms and will generate responses in response to those requests.

In one embodiment, in order to test compatibility between the software platforms, a computing system establishes a contract that contains expected request with expected response and uses the expected request with expected response as part of two separate tests that are written and invoked on the software platforms. After the tests have been performed, if a first platform returns the expected response that a second platform can use correctly and the second platform sends the expected request that the first platform can use correctly, then the compatibility of the first and second platforms is validated.

In one embodiment, the contract is established in a JSON file and the expected request and expected response are an HTTP request and HTTP response that are strictly used in the tests for the two software platforms.

Figure 1:
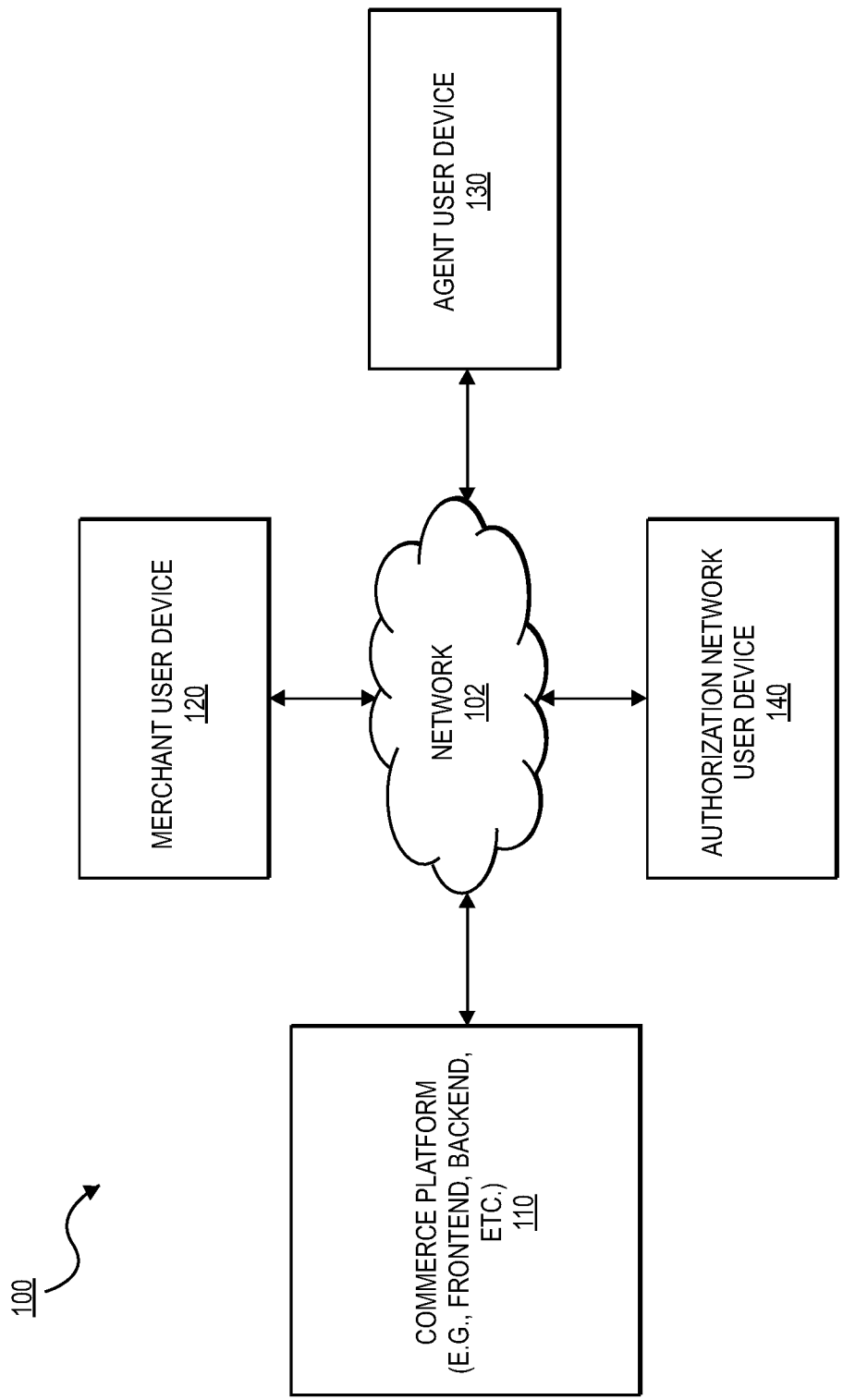
FIG. 1 is a block diagram of an exemplary system architecture for a commerce platform.

FIG. 1 is a block diagram of an exemplary system 100 architecture for a commerce platform environment. In one embodiment, system 100 includes a commerce platform 110, a merchant user device 120, an agent user device 130, and an authorization network user device 140. In one embodiment, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In one embodiment, one or more of the commerce platform 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

In some embodiments, commerce platform 110 comprises a number of software platforms that are compatible with each other. These platforms may include one or more frontend platforms and one or more backend platforms. The frontend platforms may include user interface code that is used to access services provided by one or more backend platforms. The software platforms may involve authenticating user information (e.g., username, passwords, login information, financial information, etc.). The software platforms may involve creating tokens and maintaining and verifying publishable (non-secret) keys and secret keys in a manner well-known in the art, or providing a Stripe.js enabled Payment Form using standard web technologies, such as described in U.S. Pat. Nos. 10,134,036, 9,830,596, and 9,824,354. The software platforms may involve authorizing or validating payment information, approving or declining transactions, and settling any charges that are made. The software platforms may involve browsers.

Example Embodiments of Cross-platform Contract Validation

In order to validate compatibility between different platforms (endpoints), a testing system uses cross-platform or multi-platform contract validation. That is, the testing system provides a test that validates the compatibility between different platforms (e.g., frontend, mobile device operating systems (e.g., iOS, Android, etc.), backend, offline data processing system, etc.)

In one embodiment, the contract validation involves contract testing with a shared machine-and-human-readable contract that defines the expected request and response (e.g., an HTTP request and an HTTP response). Using the contract, the testing system writes tests that strictly adhere to the contract (i.e., uses the request and response) on all applicable platforms. The request and response are the expected request and requested response that are used between two platforms, where the expected response being returned by the first platform such that the second platform can use correctly and the second platform sends the expected request that the first platform can use correctly. In this manner, the testing system uses the tests to validate compatibility between different platforms (e.g., frontend, a browser or other user interface; JavaScript, iOS, Android, backend, etc.). For example, in the case of validating the compatibility between a frontend and backend, frontend and backend tests would be generated using the same expected request and expected response (e.g., the same HTTP request and HTTP response), which defines what the backend expects as a request from the frontend and response that should be used by the backend to respond according to that request.

In one embodiment, the testing starts by defining the expected HTTP request and response and storing the HTTP request and response in a file. This operation establishes a machine-readable contract in a file that can be shared with every platform. In one embodiment, the file is a JSON file. In alternative embodiments, the file is in a YAML, XML, CSV, Protobuf, Avro, BSON, or MessagePack file or a file with a serializable format.

In one embodiment, the machine-readable contract is also human readable in that it can be inspected and a human is able to inspect the contract and understand the request and response (e.g., what is going in a request and what is coming out as a response).

In one embodiment, the contract is generated automatically using software or other processing logic.

In one embodiment, the contract has multiple requests/response pairs that are tested with different sets of tests for each pair. In one embodiment, the request/response pairs are all part of tests that are run or invoked on the same two platforms. Alternatively, some of the request/response pairs have different endpoints. In such a case, in one embodiment, the contract specifies the endpoint(s) for the request and/or response as well.

After storing the contract with the HTTP request and response pair in a JSON file, the testing system uses the information in the contract to perform testing on the platforms such as frontend and backend platforms. To that end, the testing system performs a backend test using the JSON file to form a request and validate that the response is as expected. In this case, in one embodiment, performing the test includes writing a backend test that strictly uses the HTTP request/response. In other words, the testing system writes a backend test in the backend that uses the request and validates that the response matches the one in the JSON file). The testing system also performs a frontend test using the JSON file to stub a request and mock the response to validate that the frontend works correctly according to the request/response pair in the JSON file. In one embodiment, performing the frontend test comprises writing a frontend test in the frontend (or iOS or other mobile operating system) that strictly uses the HTTP request/response in the JSON file. In other words, the testing system writes a front test that validates the expected request and uses the expected response that matches the one in the JSON file. In the case of a user interface, the expected response may include the rendering of the user interface properly. Based on the results of the tests, the testing system is able to validate whether the frontend and backend are compatible.

As a simple example, if a request from the frontend in a browser is to receive and specify two integers and such a request is to receive a response having a single integer back to the browser, the contract would specify a request with two specific numbers (e.g., 5 and 6) and a response with a specific number (e.g., 11) that is expected back if the request has the two specific numbers (e.g., 5 and 6). When the test is performed, the two specific numbers are input into the browser (e.g., fill a first text box with 5 and fill in a second text box with 6) and the test expects an 11 in response to selecting the submit button of the browser. In a production environment, the response layer may be mocked to send back the 11. There is no need to mock the backend as it is reactive and responds to the expected request as if it is in a production environment.

Note that in one embodiment, there is no interaction between the frontend and backend to perform the testing. The two tests are performed independently. This allows testing to be faster since the tests on one platform are not waiting on something from the other platform.

It should be noted that the example above uses integer inputs. However, there is not a requirement that the requests and responses use integers as part of the contract. Any parameters may be specified in the contract. For example, any complex object (e.g., a hash, nested documents, tuples, sets, bags, lists, arrays, etc.) may be used.

The testing system may include multiple computing systems, with each system testing one platform, or one computing system testing multiple platforms. In one embodiment, the testing system is part of a software production environment. The testing includes multiple tests may be performed at the same time. Alternatively, the tests are conducted at different times.

Figure 2:
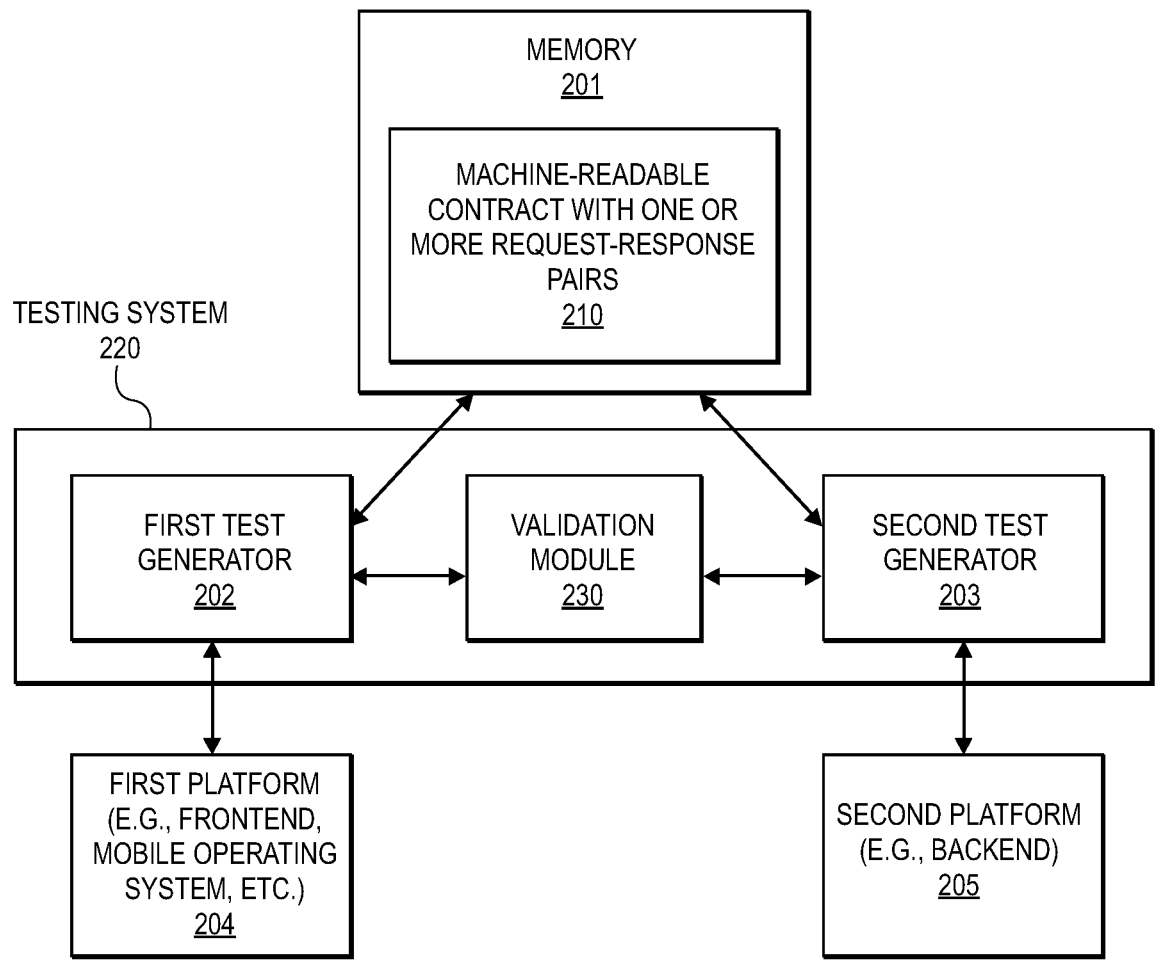
FIG. 2 is a data flow diagram illustrating a testing environment.

FIG. 2 is a data flow diagram illustrating a compatibility testing environment. Referring to FIG. 2, a machine-readable contract 210 with one or more request-response pairs is stored in memory 201. In one embodiment, contract 210 comprises a JSON file with an expected request and expected response for two platforms that operate with each other. Alternatively, contract 210 is in a YAML, XML, CSV, Protobuf, Avro, BSON, or MessagePack file. In one embodiment, contract 210 is in a file that is in a serializable format.

In one embodiment, a testing system 220 has a first test generator 202 and a second test generator 203. First test generator 202 access contract 210 and strictly uses the information in contract 210 to write a first test and invoke the first test on first platform 204. In one embodiment, first platform 204 comprises a frontend platform, mobile operating system, user interface (e.g., browser interface), etc. Second test generator 203 access contract 210 and strictly uses the information in contract 210 to write a second test and invoke the second test on second platform 205. In one embodiment, second platform 205 comprises a backend platform.

Validation module 230 of testing system 220 evaluates the results of performing the first and second tests to validate whether first platform 204 and second platform 205 are compatible. As discussed above, validation module 230 determines first platform 204 and second platform 205 are compatible if second platform 205 returns the expected response that first platform 204 can use correctly and the first platform 204 sends the expected request that the second platform 205 can use correctly.

An example of the use of testing system 220 on frontend and backend platforms is given below.

An Example of Frontend and Backend Contract Testing

Below is an example that illustrates frontend and backend contract testing. This example ensures that a new subscriber chart with the date picker on the frontend is compatible with the backend.

As a first step, a contract is established in a JSON file as provided in the example below. Notice that the end time in the request is not exclusive, but an end time in the response is exclusive.

For example, ./test-contracts/contract.json may contain the expected request and response as shown below:

```
{
  "request": {
    "start time": "2020-10-15",
    "end time": "2020-10-17",
    "unit": "day"
  },
  "response": {
    "data": {
      "2020-10-15": 3,
      "2020-10-16": 10
    }
  }
}
```

As a second step, a frontend test is written that validates the expected request and uses the expected response. In one embodiment, the frontend test selects the appropriate date on the date picker in order to make the request match the one in the contract above. In one embodiment, the frontend test also validates that, given the response, the chart renders correctly. An example is provided below.

```
const contract = JSON.parse(fs.readFileSync('./test-contracts/contract.json'));
mockAjaxImplementation('/ajax/sample_chart', (request) -> {
  expect(request.data).toEqual(contract.request);
  return Promise.resolve(contract.response);
});
const page = mount(<SampleChart>);
page.find("#datePicker.start").fill("2020-10-15");
page.find("#datePicker.end").fill("2020-10-17");
page.find("#submit").click( );
expect(page.find("#bar-chart.date20201015").getText( ))
  .toEqual(contract.response.data["2020-10-15"] + " people");
expect(page.find("#bar-chart.date20201016").getText( ))
  .toEqual(contract.response.data["2020-10-16"] + " people");
```

As a third step, a backend test is written that uses the expected request and validates the expected response. In one embodiment, the backend test uses the request in the contract and validates that the response matches the one in the contract. An example is provided below.

```
contract = JSON.parse(File.read("./test-contracts/contract.json"))
contract.response.data.each do |date, value|
  TimeSeriesDataStore.expects(get).with(date).returns(value)
end
response = post("/ajax/sample_chart", contract.request)
assert_equal(contract.response, response)
```

There are a number of benefits associated with using the approaches described herein. For example, using the cross-platform validation reduces the scope of manual testing because contract testing validates the compatibility among all platforms. As another example, using the cross-platform validation reduces the risk of making a breaking change on one platform and forgetting to update other platforms.

Figure 3:
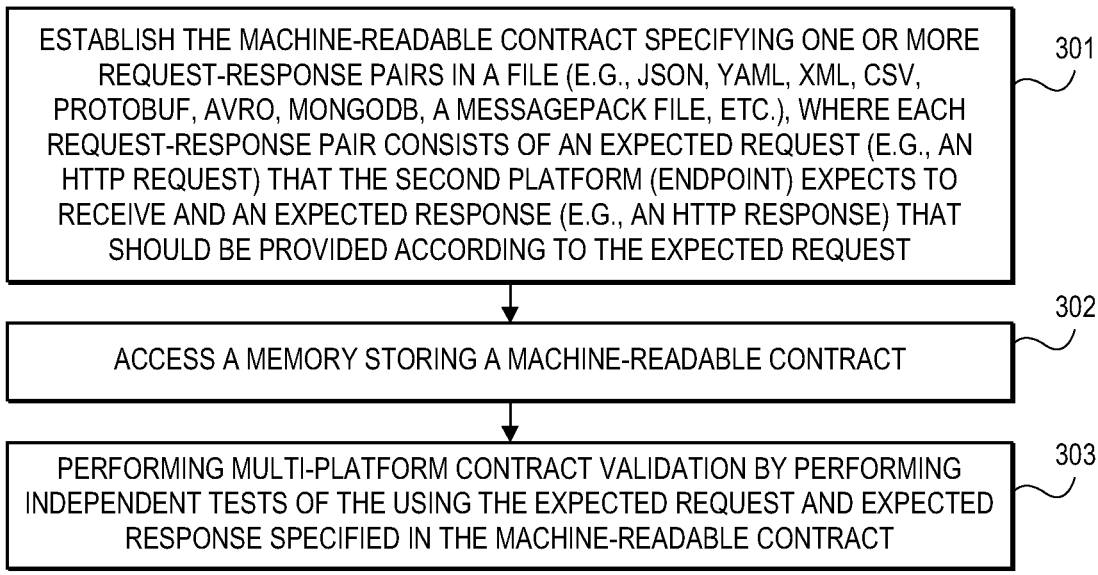
FIG. 3 is a flow diagram of one embodiment of a process for validating compatibility between first and second platforms (endpoints).

FIG. 3 is a flow diagram of one embodiment of a process for validating compatibility between first and second platforms (endpoints). In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 3, the process begins by establishing and storing a machine-readable contract specifying one or more request-response pairs in a file (e.g., JSON, YAML, XML, CSV, Protobuf, Avro, BSON, a MessagePack file, etc.), where each request-response pair consists of an expected request (e.g., an HTTP request) that the second platform expects to receive and an expected response (e.g., an HTTP response) that should be provided according to the expected request (processing block 301).

Subsequently, processing logic accesses access the memory storing a machine-readable contract (processing block 302) and performs multi-platform contract validation by performing independent tests on two platforms (endpoints) using the expected request and expected response specified in the machine-readable contract (processing block 303).

Figure 4:
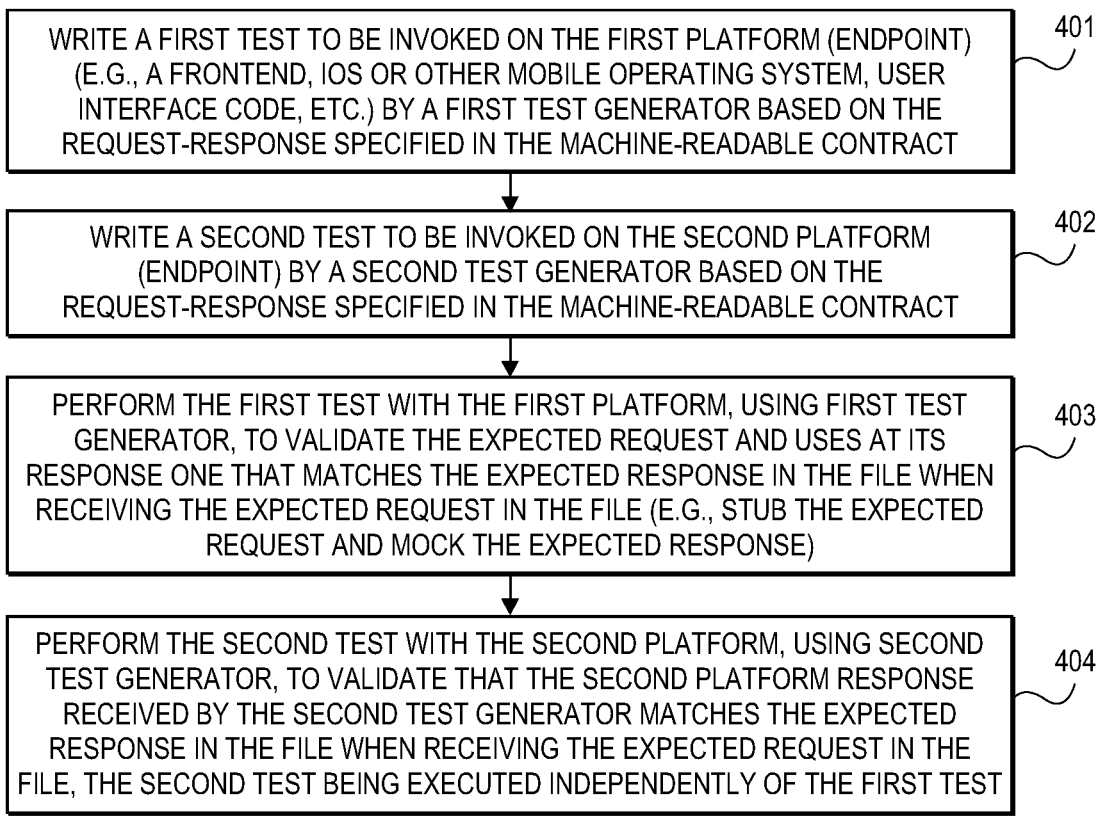
FIG. 4 is a flow diagram of one embodiment of a process for performing cross-platform validation.

FIG. 4 is a flow diagram of one embodiment of a process for performing cross-platform validation. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 4, the process begins by writing a first test to be invoked on a first platform (a first endpoint) (e.g., a frontend, iOS or other mobile operating system, user interface code, etc.) by a first test generator based on the request-response specified in the machine-readable contract (processing block 401) and writing a second test to be invoked on the second platform (second endpoint) by a second test generator based on the request-response specified in the machine-readable contract (processing block 402).

Then processing logic performs, or otherwise invokes, the first test with the first platform, using a first test generator, to validate the expected request and uses at its response one that matches the expected response in the file when receiving the expected request in the file (e.g., stub the expected request and mock the expected response) (processing block 402)

Processing logic also performs the second test with the second platform, using a second test generator, to validate that the second platform response received by the second test generator matches the expected response in the file when receiving the expected request in the file (processing block 404). In one embodiment, the second test is executed independently of the first test.

An Example Computer System

Figure 5:
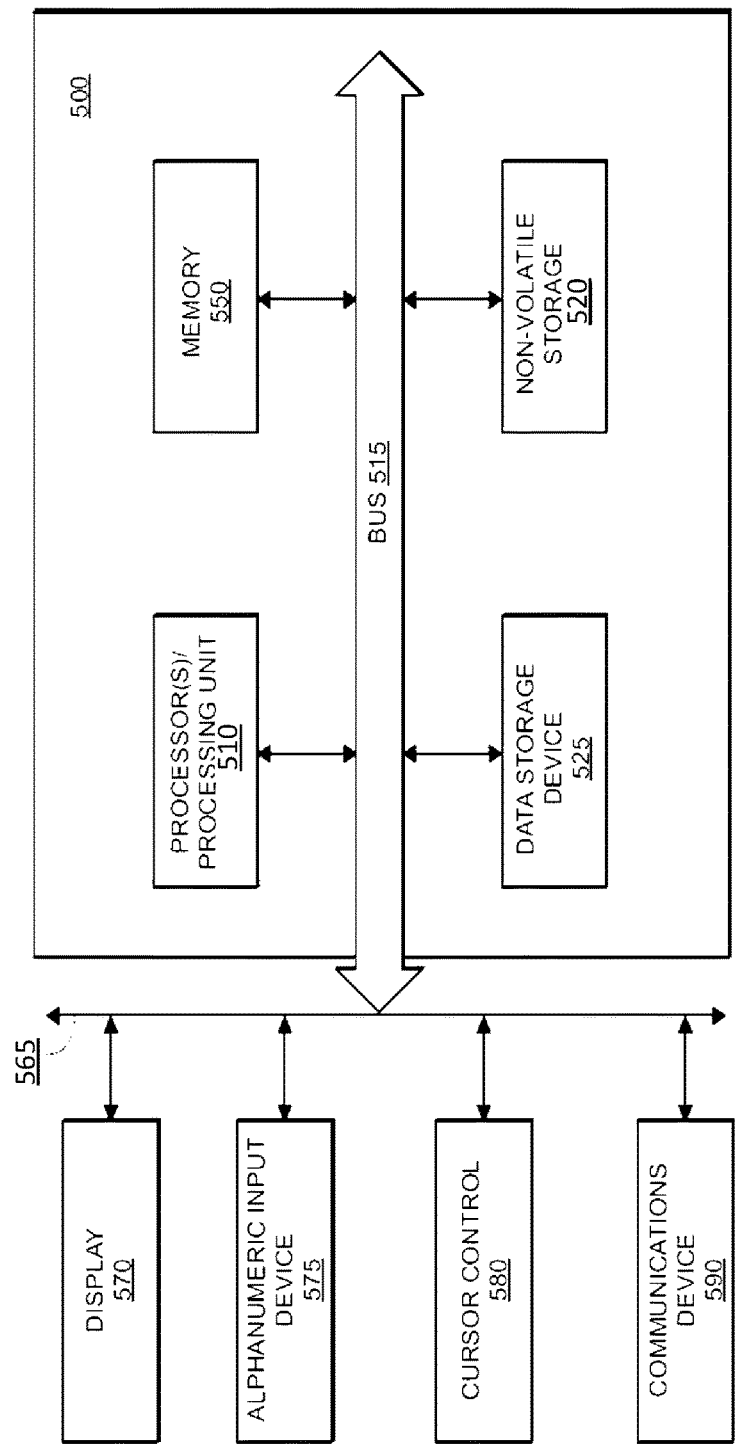
FIG. 5 is one embodiment of a computer system that may be used to support the systems and operations discussed herein.

FIG. 5 is one embodiment of a computer system that may be used to support the systems and operations discussed herein. It will be apparent to those of ordinary skill in the art, however, that other alternative systems of various system architectures may also be used.

The data processing system illustrated in FIG. 5 includes a bus or other internal communication means 515 for communicating information, and a processor(s) 510 coupled to the bus 515 for processing information. The system further comprises a random-access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

In one embodiment, processor(s) 510 executes instructions to perform any of the operations described above including, but not limited to, establishing and storing machine-readable contracts with request-response pairs; accessing machine readable contracts from memory, writing and invoking tests using information in machine-readable contracts for platforms (endpoints), and validating responses and requests associated with the tests on the two platforms match those in machine-readable contacts.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method for validating compatibility between first and second endpoints, the method comprising: accessing a memory storing a machine-readable contract specifying a request-response pair in a file, the request-response pair consisting of an expected request that the second endpoint expects to receive from the first endpoint and an expected response that should be provided by the second endpoint according to the expected request from the first endpoint; and performing multi-platform contract validation by performing independent tests for the first and second endpoints, using the expected request and expected response specified in the machine-readable contract.

Example 2 is the method of example 1 that may optionally include that performing multi-platform contract validation comprises: performing a first test with the first endpoint, by a first test generator and based on the request-response specified in the machine-readable contract, to validate the expected request and uses at its response one that matches the expected response in the file when receiving the expected request in the file; and performing a second test with the second endpoint, by a second test generator and based on the request-response specified in the machine-readable contract, to validate that the second endpoint response received by the second test generator matches the expected response in the file when receiving the expected request in the file, including executing the second test independently of the first test.

Example 3 is the method of example 1 that may optionally include that the first endpoint comprises a frontend and the second endpoint comprises a backend.

Example 4 is the method of example 1 that may optionally include that the first endpoint comprises code for a user interface or a mobile device operating system and the second endpoint comprises backend code.

Example 5 is the method of example 4 that may optionally include that performing the first test comprises stubbing the expected request and mocking the expected response.

Example 6 is the method of example 1 that may optionally include that the file is a JSON, YAML, XML, CSV, Protobuf, Avro, BSON, or a MessagePack file.

Example 7 is the method of example 1 that may optionally include that the request and response comprise an HTTP request and an HTTP response, respectively.

Example 8 is the method of example 7 that may optionally include establishing the machine-readable contract comprises storing an HTTP request and response pair in a JSON file.

Example 9 is the method of example 1 that may optionally include that the file comprises a plurality of tests that comprise distinct request-response pairs of expected requests and expected responses.

Example 10 is one or more non-transitory computer readable storage media having instructions stored thereupon which, when executed by a system having at least a processor and a memory therein, cause the system to perform operations comprising: accessing a memory storing a machine-readable contract specifying a request-response pair in a file, the request-response pair consisting of an expected request that the second endpoint expects to receive from the first endpoint and an expected response that should be provided by the second endpoint according to the expected request from the first endpoint; and performing multi-platform contract validation by performing independent tests for the first and second endpoints using the expected request and expected response specified in the machine-readable contract.

Example 11 is the computer readable storage media of example 10 that may optionally include that performing multi-platform contract validation comprises: performing a first test with the first endpoint, by a first test generator and based on the request-response specified in the machine-readable contract, to validate the expected request and uses at its response one that matches the expected response in the file when receiving the expected request in the file; and performing a second test with the second endpoint, by a second test generator and based on the request-response specified in the machine-readable contract, to validate that the second endpoint response received by the second test generator matches the expected response in the file when receiving the expected request in the file, including executing the second test independently of the first test.

Example 12 is the computer readable storage media of example 10 that may optionally include that the first endpoint comprises a frontend and the second endpoint comprises a backend.

Example 13 is the computer readable storage media of example 10 that may optionally include that the file is a JSON, YAML, XML, CSV, Protobuf, Avro, BSON, or a MessagePack file.

Example 14 is the computer readable storage media of example 10 that may optionally include that the request and response comprise an HTTP request and an HTTP response, respectively, and wherein the method further comprises establishing the machine-readable contract comprises storing an HTTP request and response pair in a JSON file.

Example 15 is a system comprising: a memory to store instructions; and one or more processors coupled to the memory to execute the stored instructions to: access a memory storing a machine-readable contract specifying a request-response pair in a file, the request-response pair consisting of an expected request that a second endpoint expects to receive from a first endpoint and an expected response that should be provided by the second endpoint according to the expected request from the first endpoint; and perform multi-platform contract validation by performing independent tests for the first and second endpoints using the expected request and expected response specified in the machine-readable contract.

Example 16 is the system of example 15 that may optionally include that the one or more processors perform multi-platform contract validation by: performing a first test with the first endpoint, by a first test generator and based on the request-response specified in the machine-readable contract, to validate the expected request and uses at its response one that matches the expected response in the file when receiving the expected request in the file; and performing a second test with the second endpoint, by a second test generator and based on the request-response specified in the machine-readable contract, to validate that the second endpoint response received by the second test generator matches the expected response in the file when receiving the expected request in the file, including executing the second test independently of the first test.

Example 17 is the system of example 15 that may optionally include that the first endpoint comprises a frontend and the second endpoint comprises a backend.

Example 18 is the system of example 15 that may optionally include that performing the first test comprises stubbing the expected request and mocking the expected response.

Example 19 is the system of example 15 that may optionally include that the file is a JSON, YAML, XML, CSV, Protobuf, Avro, BSON, or a MessagePack file.

Example 20 is the system of example 15 that may optionally include that the request and response comprise an HTTP request and an HTTP response, respectively, and wherein the one or more processors are operable to establish the machine-readable contract comprises storing an HTTP request and response pair in a JSON file.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for validating compatibility between first and second endpoints, the method comprising:

accessing a non-transitory memory storing a machine-readable contract specifying a request-response pair in a file, the request-response pair consisting of an expected request that the second endpoint expects to receive from the first endpoint and an expected response that should be provided by the second endpoint according to the expected request from the first endpoint, the first and second endpoints being different platforms that operate with each other using requests and responses; and performing multi-platform contract validation to determine whether the first and second endpoints are compatible with each other, by performing independent tests for the first and second endpoints at the same time without the first and second endpoints interacting with each other, using the expected request and expected response specified in the machine-readable contract, wherein performing multi-platform contract validation comprises performing a first test with the first endpoint, by a first test generator and based on the request-response specified in the machine-readable contract, to validate the expected request and uses as its response one that matches the expected response in the file when receiving the expected request in the file, performing a second test with the second endpoint, by a second test generator and based on the request-response specified in the machine-readable contract, to validate that the second endpoint response received by the second test generator matches the expected response in the file when receiving the expected request in the file, and validating compatibility of the different platforms by determining that the second endpoint returns the expected response that is in the file when receiving the expected request in the file and that the first endpoint sends the expected request that produces the expected response in the file.

2. The method of claim 1 wherein the first endpoint comprises a frontend and the second endpoint comprises a backend.

3. The method of claim 1 wherein the first endpoint comprises code for a user interface or a mobile device operating system and the second endpoint comprises back-end code.

4. The method of claim 3 wherein performing the first test comprises stubbing the expected request and mocking the expected response.

5. The method of claim 1 wherein the file is a JSON, YAML, XML, CSV, Protobuf, Avro, BSON, or a Message-Pack file.

6. The method of claim 1 wherein the request and response comprise an HTTP request and an HTTP response, respectively.

7. The method of claim 6 further comprising establishing the machine-readable contract comprises storing an HTTP request and response pair in a JSON file.

8. The method of claim 1 wherein the file comprises a plurality of tests that comprise distinct request-response pairs of expected requests and expected responses.

9. The method of claim 1 wherein the expected response includes rendering of a user interface properly.

10. The method of claim 1 wherein the machine-readable contract is also human-readable.

11. A system comprising:
a memory to store instructions; and
one or more processors coupled to the memory to execute the stored instructions to:
access a memory storing a machine-readable contract specifying a request-response pair in a file, the request-response pair consisting of an expected request that a second endpoint expects to receive from a first endpoint and an expected response that should be provided by the second endpoint according to the expected request from the first endpoint, the first and second endpoints being different platforms that operate with each other using requests and responses; and
perform multi-platform contract validation to determine whether the first and second endpoints are compatible with each other, by performing independent tests for the first and second endpoints at the same time without the first and second endpoints interacting with each other, using the expected request and expected response specified in the machine-readable contract, wherein the one or more processors are operable to perform the multi-platform contract validation by
performing a first test with the first endpoint, by a first test generator and based on the request-response specified in the machine-readable contract, to validate the expected request and uses as its response one that matches the expected response in the file when receiving the expected request in the file,
performing a second test with the second endpoint, by a second test generator and based on the request-response specified in the machine-readable contract, to validate that the second endpoint response received by the second test generator matches the expected response in the file when receiving the expected request in the file, and validating compatibility of the different platforms by determining that the second endpoint returns the expected response that is in the file when receiving the expected request in the file and that the first endpoint sends the expected request that produces the expected response in the file.

12. The system of claim 11 wherein the first endpoint comprises a frontend and the second endpoint comprises a backend.

13. The system of claim 12 wherein performing the first test comprises stubbing the expected request and mocking the expected response.

14. The system of claim 11 wherein the file is a JSON, YAML, XML, CSV, Protobuf, Avro, BSON, or a Message-Pack file.

15. The system of claim 11 wherein the request and response comprise an HTTP request and an HTTP response, respectively, and wherein the one or more processors are operable to establish the machine-readable contract comprises storing an HTTP request and response pair in a JSON file.

16. One or more non-transitory computer readable storage media having instructions stored thereupon which, when executed by a system having at least a processor and a memory therein, cause the system to perform operations comprising:
accessing a memory storing a machine-readable contract specifying a request-response pair in a file, the request-response pair consisting of an expected request that the second endpoint expects to receive from the first endpoint and an expected response that should be provided by the second endpoint according to the expected request from the first endpoint, the first and second endpoints being different platforms that operate with each other using requests and responses; and
performing multi-platform contract validation to determine whether the first and second endpoints are compatible with each other, by performing independent tests for the first and second endpoints at the same time without the first and second endpoints interacting with each other, using the expected request and expected response specified in the machine-readable contract, wherein performing multi-platform contract validation comprises
performing a first test with the first endpoint, by a first test generator and based on the request-response specified in the machine-readable contract, to validate the expected request and uses as its response one that matches the expected response in the file when receiving the expected request in the file,
performing a second test with the second endpoint, by a second test generator and based on the request-response specified in the machine-readable contract, to validate that the second endpoint response received by the second test generator matches the expected response in the file when receiving the expected request in the file, and
validating compatibility of the different platforms by determining that the second endpoint returns the expected response that is in the file when receiving the expected request in the file and that the first endpoint sends the expected request that produces the expected response in the file.

17. The one or more non-transitory computer readable storage media of claim 16 wherein the first endpoint comprises a frontend and the second endpoint comprises a backend.

18. The one or more non-transitory computer readable storage media of claim 16 wherein the file is a JSON, YAML, XML, CSV, Protobuf, Avro, BSON, or a MessagePack file.

19. The one or more non-transitory computer readable storage media of claim 16 wherein the request and response comprise an HTTP request and an HTTP response, respectively, and wherein the method further comprises establishing the machine-readable contract comprises storing an HTTP request and response pair in a JSON file.

\* \* \* \* \*